(12) United States Patent
Guo et al.

(10) Patent No.: US 10,878,462 B2
(45) Date of Patent: Dec. 29, 2020

(54) DYNAMIC INTERNET ADVERTISING SYSTEM

(71) Applicant: International Business Machines Corporation, Armonk, NY (US)

(72) Inventors: Shang Qing Guo, Cortland Manor, NY (US); Jeffrey Owen Kephart, Cortland Manor, NY (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 14/870,518

(22) Filed: Sep. 30, 2015

(65) Prior Publication Data
US 2016/0019606 A1    Jan. 21, 2016

Related U.S. Application Data

(63) Continuation of application No. 12/826,924, filed on Jun. 30, 2010, now abandoned.

(51) Int. Cl.
*G06Q 30/00* (2012.01)
*G06Q 30/02* (2012.01)

(52) U.S. Cl.
CPC ......... *G06Q 30/0277* (2013.01); *G06Q 30/02* (2013.01); *G06Q 30/0242* (2013.01); *G06Q 30/0251* (2013.01); *G06Q 30/0274* (2013.01)

(58) Field of Classification Search
CPC .............................................. G06Q 30/02–277
USPC ........................................... 705/14.46, 14.49
See application file for complete search history.

(56) References Cited

U.S. PATENT DOCUMENTS

| | | | |
|---|---|---|---|
| 6,654,725 B1 | 11/2003 | Langheinrich et al. | |
| 8,145,526 B2* | 3/2012 | Redlich | G06Q 30/02 705/14.46 |
| 9,043,828 B1* | 5/2015 | Jing | H04N 21/258 358/1.6 |
| 2007/0118425 A1* | 5/2007 | Yruski | H04L 67/306 705/14.61 |
| 2008/0082905 A1* | 4/2008 | Martinez | G06F 17/30873 715/205 |

(Continued)

*Primary Examiner* — Naresh Vig
(74) *Attorney, Agent, or Firm* — Robert Bunker; Ryan, Mason & Lewis, LLP (57) ABSTRACT

Methods and apparatus are provided for the dynamic placement, management and monitoring of Internet advertising. A provider of Internet content distributes the Internet content by embedding an advertisement placeholder in the Internet content; and provides the Internet content to an aggregator web site. The aggregator web site presents the Internet content to at least one end user with at least one advertisement in the advertisement placeholder. The advertisement placeholder is processed by a third party agent to automatically share revenue from the at least one advertisement with the provider of the Internet content and a provider of the aggregator web site. The advertisement placeholder can optionally be embedded in the Internet content using one or more templates. The third party agent also evaluates the content and at least one policy of multiple parties to identify at least one advertisement to present in the advertisement placeholder. The advertisement placeholder embodies a three party agreement between the provider of the Internet content, the provider of the aggregator web site and at least one advertiser.

25 Claims, 7 Drawing Sheets

(56) References Cited

U.S. PATENT DOCUMENTS

| | | | |
|---|---|---|---|
| 2009/0094108 A1* | 4/2009 | Bhandari | G06Q 30/0277 |
| | | | 705/14.73 |
| 2009/0132363 A1 | 5/2009 | Powell et al. | |
| 2010/0161411 A1* | 6/2010 | Wu | G06Q 30/02 |
| | | | 705/14.45 |
| 2011/0119128 A1* | 5/2011 | Fang | G06Q 30/02 |
| | | | 705/14.49 |

* cited by examiner

DYNAMIC INTERNET ADVERTISING SYSTEM

CROSS-REFERENCE TO RELATED APPLICATIONS

This application is a continuation of U.S. patent application Ser. No. 12/826,924, filed Jun. 30, 2010, incorporated by reference herein.

FIELD OF THE INVENTION

The present invention relates generally to electronic advertising systems and, more particularly, to methods and apparatus for dynamic placement, management and monitoring of web-based advertising.

BACKGROUND OF THE INVENTION

Web logs, typically referred to as "blogs," are increasingly popular on the Internet. Blogs are often used to disseminate information and to form public opinion, for example, by news services and politicians. Blogs are often maintained by an individual with regular entries, such as commentary and other material, on a particular topic. Blog entries are typically displayed in reverse-chronological order. Readers of the blog can frequently provide comments in an interactive manner.

Readers have an often overwhelming array of sources from which to get desired information. A number of techniques have been proposed or suggested to allow online users to more effectively identify information of interest. For example, there are a number of web sites available that aggregate certain types of information from multiple online sources. For example, a news aggregator aggregates news from multiple news sources. Increasingly, such aggregator web sites incorporate content from one or more blogs.

Despite the growing popularity of blogs, bloggers have typically been unable to readily monetize the web traffic they generate. In addition, it is difficult for advertisers to determine where to best place advertisements, since content is diffusely spread over the Internet. A need therefore exists for methods and apparatus for dynamic placement, management and monitoring of blog advertising. A further need exists for methods and apparatus for dynamic placement, management and monitoring of blog advertising that generate additional revenue for bloggers and provide improved targeting for advertisers.

SUMMARY OF THE INVENTION

Generally, methods and apparatus are provided for the dynamic placement, management and monitoring of Internet advertising. According to one aspect of the invention, a provider of Internet content distributes the Internet content by embedding an advertisement placeholder in the Internet content; and providing the Internet content to an aggregator web site, wherein the aggregator web site presents the Internet content to at least one end user with at least one advertisement in the advertisement placeholder, wherein the advertisement placeholder is processed by a third party agent to automatically share revenue from the at least one advertisement with the provider of the Internet content and a provider of the aggregator web site. The advertisement placeholder can optionally be embedded in the Internet content using one or more templates.

According to one aspect of the invention, the third party agent processes the Internet content by receiving a notification that the Internet content has been posted on an aggregator web site, wherein the Internet content has one or more embedded advertisement placeholders; evaluating at least one policy of one or more of a provider of the Internet content, a provider of the Internet aggregator web site and at least one advertiser to identify at least one advertisement to present in the advertisement placeholder; and automatically sharing revenue from the at least one advertisement among the provider of the Internet content and the provider of the aggregator web site.

The advertisement placeholder embodies a three party agreement between the provider of the Internet content, the provider of the aggregator web site and at least one advertiser. The advertisement placeholder also facilitates the redistribution of the Internet content to a third party web site. Thus, revenue from the advertisement in the redistributed content is automatically shared by the provider of the Internet content, the provider of the aggregator web site and a provider of third party web site.

The advertisement placeholder has at least one associated policy. The policy can be from the provider of the Internet content, the provider of the Internet aggregator web site or an advertiser. Aspects of the invention match the policies of at least two involved parties. The policies can be established for a given advertisement placeholder in the Internet content or can be based on default policies established by the provider of the Internet content, the provider of the Internet aggregator web site and an advertiser. In addition, the Internet content is dynamically matches to targeting criteria of at least one advertiser.

Additional aspects of the invention optionally monitor a performance of the at least one advertisement. For example, an advertisement can be selected based on a prior performance evaluation.

A more complete understanding of the present invention, as well as further features and advantages of the present invention, will be obtained by reference to the following detailed description and drawings.

DETAILED DESCRIPTION OF PREFERRED EMBODIMENTS

Figure 1:
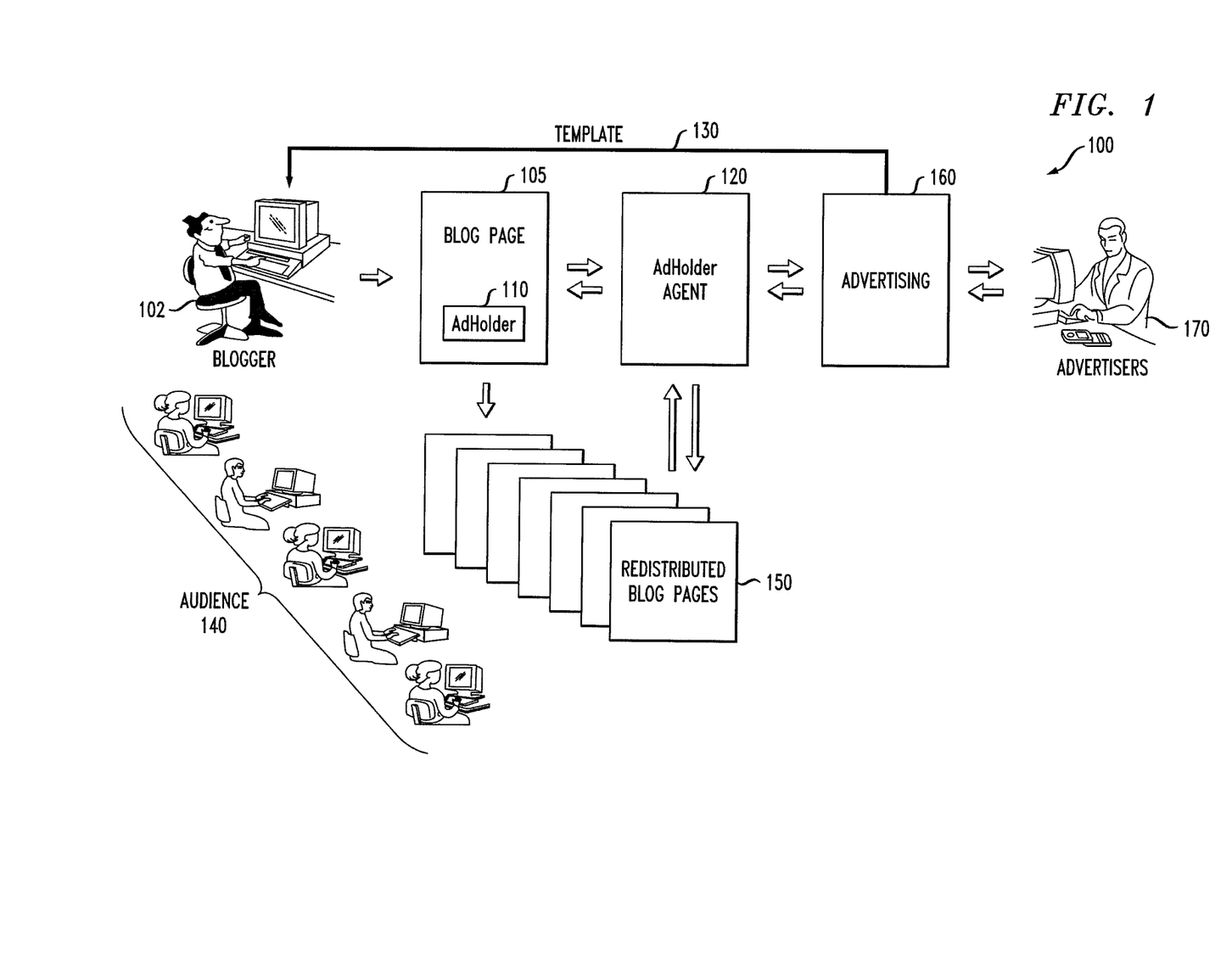
FIG. 1 illustrates an exemplary dynamic blog advertising system incorporating features of the present invention.

The present invention provides methods and apparatus for dynamic placement, management and monitoring of blog advertising. Among other benefits, the present invention generates additional revenue for bloggers and provides improved targeting for advertisers. FIG. 1 illustrates an exemplary dynamic blog advertising system 100. As shown in FIG. 1, the disclosed dynamic blog advertising system 100 comprises one or more AdHolders 110 embedded in a blog page 105 and an AdHolder agent 120. Generally, an exemplary AdHolder 110 is a template-based advertisement placeholder (e.g., an "advertising spot") in one or more blog pages 105. The AdHolder agent 120 provides a server-side management system to inject advertisements into AdHolders 110 embedded in the blog pages 105 via a dynamic agent-based process whereby the advertisers are dynamically matched with the content of a given blog. The AdHolder agent 120 enables and optimizes the AdHolder 110, and also monitors advertising traffic and responses.

As used herein, a blog comprises any Internet content comprised of one or more entries by an individual or group of individuals. For example, a blog can include a serialized log of comments posted by an individual on a web site, such as critiques or products in a certain category (i.e., antique cars).

As shown in FIG. 1 and as discussed further below in conjunction with FIG. 6, when a blog page 105 embedded with one or more AdHolders 110 is uploaded to the Internet by a blogger 102, the AdHolder Agent 120 will be notified immediately via an RSS (Really Simple Syndication) feed. As discussed further below in conjunction with FIG. 2, the blogger 102 optionally uses a template 130 to inject his or her content and uploads the filled-in template to the site. By using a template 130 from the AdHolder Agent 120, a blogger 102 is able to embed AdHolders 110 in his/her blog pages 105 to receive dynamic advertising feeds 160 that will contribute revenue to the blogger 105.

When an embedded blog page 105 is uploaded, the AdHolder Agent 120 is notified and performs an initial scan of the blog page 105 employing a matching process, discussed further below, in order to recommend the blog page 105 to one or more appropriate advertisers 170. Following an authorization from the advertiser(s) 170, the AdHolder Agent 120 enables advertising feeds 160 to the authorized blog pages 105.

According to a further aspect of the invention, the AdHolder Agent 120 optionally adjusts and updates the advertising 160 based on advertisers' strategies, placement policies and "hit" analysis. This work is typically done after the blogger 102 publishes his or her content. Thus, advantageously, these "post-processing" actions do not require any work from the blogger 102. According to yet another aspect of the invention, as discussed further below in conjunction with FIGS. 3 and 6, the AdHolder Agent 120 also works on redistributed blog pages 150 that are being redistributed by third party websites. The redistributed blog pages 150 incorporate a blog page 105 or portions thereof. The blog page 105 and redistributed blog pages 150 can be viewed by an audience 140.

If a reader clicks on an advertisement, it will go through the AdHolder Agent 120 to get verified and redirected to the advertiser's site.

Three Party Negotiation of Advertising Terms/Conditions

According to one aspect of the invention, the disclosed AdHolders 110 provide a syndication model whereby advertising revenue and syndication terms can be negotiated virtually among three parties via the model. In particular, the present invention enables a model whereby bloggers, advertisers and Internet aggregators (i.e., blog site owners) can cooperate to generate revenue for bloggers and Internet aggregators and provide improved targeting for advertisers.

As discussed herein, the negotiations among the three parties address, for example, acceptable pricing and content limitations. The three parties declare their policies, for example, in an XML format. The AdHolder agent 120 will enforce and reconcile the stated policies of the three parties, for example, using rules and/or filters. For example, suppose a web site owner declares that no cigarette advertisements should appear on a given web site. The AdHolder agent 120 will scan any potential ads for mention of words such as "cigarette," and "smoking," and prevent such ads from appearing on the given web site. If the blogger declares that ads each initially go through a two day screening to see if they generate a sufficient click-through rate, then the AdHolder agent 120 injects ads satisfying the policy constraints of the site owner and blogger on a two day rotation schedule.

The framework provided by the present invention allows an Internet aggregator or blog site owner to declare the types of content and advertising that are permissible on a given web site. For example, a given Internet aggregator may not want adult content or advertising and not want cigarette advertisements. On the other hand, a blog site may be very narrowly focused-just permitting blogs about animals and advertising about animals. In addition, Internet aggregators can declare minimum and/or maximum duration for any advertising agreement, one time placement fees, if applicable, and revenue sharing arrangements with bloggers. Internet aggregators can also declare payment terms and negotiate all payment terms exclusively through a blogger (e.g., Net 7 days through PayPal).

The framework provided by the present invention allows a blogger 102 to declare the types of advertising that are permissible or unacceptable in the blog of the blogger 102. For example, the blogger 102 can specify words/word families that may or may not be included in advertisements. In one variation, the blogger 102 can specify that all ads must be pre-approved by blogger 102, in which case potential ads can be placed in a queue on an administrative page for the blogger 102 to approve. In addition, bloggers 102 can declare minimum and/or maximum duration for any advertising agreement, one-time placement fees, if applicable, and revenue sharing arrangements with Internet aggregators, in a similar manner to the way the Internet aggregators declare the same. In further variations, the blogger 102 can specify one or more of a rotation plan for ads, minimum and/or maximum duration for given ads, a trial period duration during which competing ads are rotated to see which ads generate the most revenue, periods when greatest revenue-generating ads are run. Trial periods can be followed by run periods over a cycle, to keep top revenue-generating information fresh. The bloggers 102 can also declare payment terms separately for blog site owner and advertisers, and the fees from advertisers that are due to the blog site owner paid through blogger.

The framework provided by the present invention allows an advertiser 170 to optionally declare the types of blog sites that they are interested in appearing on (again supplying matching words/phrases). Advertisers 170 can also provide an ad stream that is matched based on content similarity with the blogger's content (obeying declared constraints by all parties). In addition, advertisers 170 can declare minimum and/or maximum duration for any advertising, placement fees (such as fee-per-click-through), if applicable, and payment terms. The advertisers 170 can specify times of day, days of week, day of year (i.e., 10 days before Christmas) that ads should appear. Declarations can be made on a per-ad and/or per-campaign basis.

Figure 2:
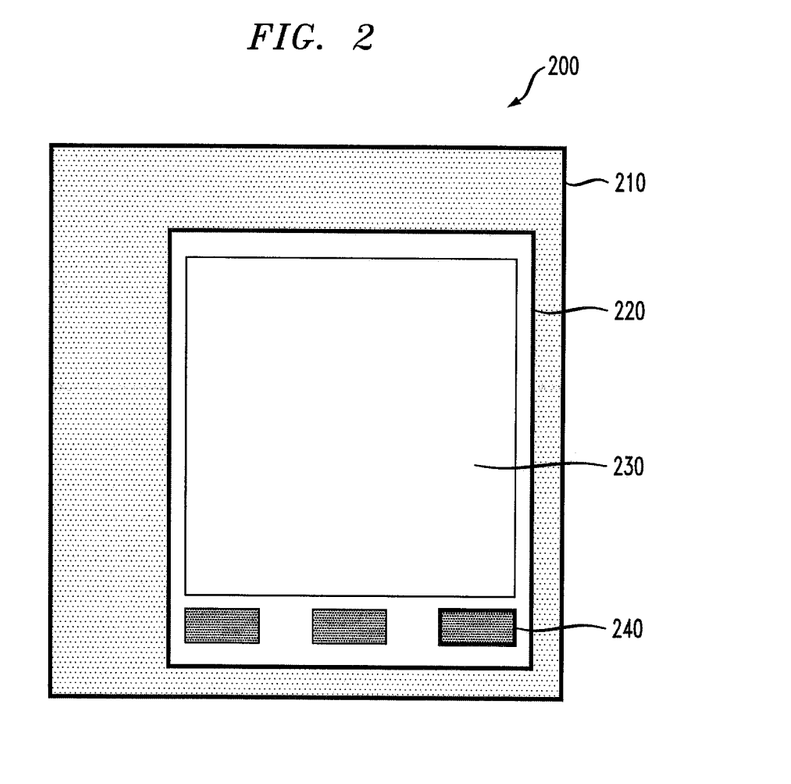
FIG. 2 illustrates an exemplary container template having a plurality of AdHolders.

FIG. 2 illustrates an exemplary container template 200 having a plurality of AdHolders 240. As shown in FIG. 2, the exemplary container template 200 comprises a blogging page 210 containing a controlled area 220 for the blogger, which contains the blogger's content 230. Generally, each AdHolder 240 is a placeholder for an advertisement. The AdHolder 240 can be implemented, for example, as code running on the server of the blog site owner or the AdHolder Agent (for example as a Java Server Page or JSP). The AdHolder will pass a pointer to the web page in which it is resident so that the AdHolder Agent can scan the page's content, as well as ids of the blog site owner and blogger so that the AdHolder Agent can reconcile and implement the policies of both parties in conjunction with policies of potential advertisers. The advertisements that get injected into the AdHolder slots can be coded, for example, as banner ads, buttons or hyperlinks, possibly with surrounding text and/or images.

The exemplary AdHolders 240 contain a Site identifier and an AdHolder identifier. The "Site ID" is used to identify the site where the content resides while the "AdHolder ID" is used to identify the advertisement to be placed. The Site ID and the AdHolder ID provides an indication to the AdHolder Agent of the advertisement and the site that a given click-through corresponds to, and the combination of the Site id and AdHolder id can be used to link to a specific advertising feed when enabling that AdHolder 110. In addition, as discussed below, with the Site ID and the AdHolder ID in the blog page, the AdHolder Agent 120 can adjust/optimize advertisements in real-time by re-linking the AdHolder 110 to higher click-through advertisements to maximize advertising effectiveness. The Container template 200 also includes a link allowing a third party to download the entire html associated with the blog page, which contains the blogger's content and AdHolders embedded for re-distribution.

Figure 3:
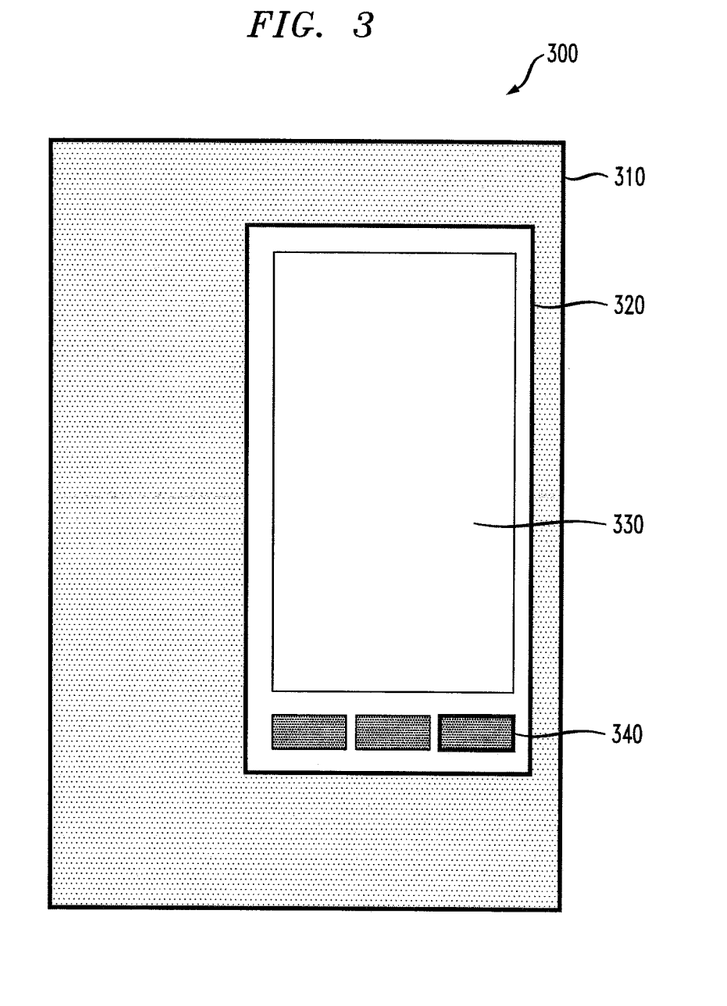
FIG. 3 illustrates an exemplary container template for the redistribution of blog content having a plurality of AdHolders.

FIG. 3 illustrates an exemplary container template 300 for the redistribution of blog content having a plurality of AdHolders 340. For example, when a third party wants to include a particular blog (or portion thereof) on a web site of the third party, the third party can download the html of the blog which includes all content and AdHolders and fit into the page. In one exemplary embodiment, the original blog page 105 includes a link that the third party can follow to obtain the blog content (which includes the AdHolders) for the redistributed blog page 140. When the blog is included on the third party web site, the siteID in the html is changed and the AdHolders are re-linked. As shown in FIG. 3, a web page 310 of the third party contains an area 320 for the html associated with the redistributed blog. Thus, the web page 310 of the third party will include the content 330 from the blog, as well as the original AdHolders 340. The AdHolders 340 go with the blog page 105 and stay effective on third party websites.

Thus, the disclosed AdHolder Agent 120 provides bloggers and advertisers the ability to track how the blog pages are re-distributed by third parties. In this manner, bloggers and advertisers can gain additional revenue from blog re-distribution through AdHolders 340 in the container template 200 of the blog advertising system 100. Blog pages 105 are embedded with advertising spaces along with a mechanism that:

1) enables bloggers 102 to offer advertisers 107 advertising spaces in their own controlled area of blog pages 105;

2) enables advertisers 170 to place and replace ads (i.e., as a market segment is better understood, or simply for variety and to keep the advertisements fresh) on blog pages 105;

3) enables advertising on re-distributed blog pages 150 with revenue accruing to the original content provider (i.e., blogger 102); and 4) enables advertising on blog archives.

Figure 4:
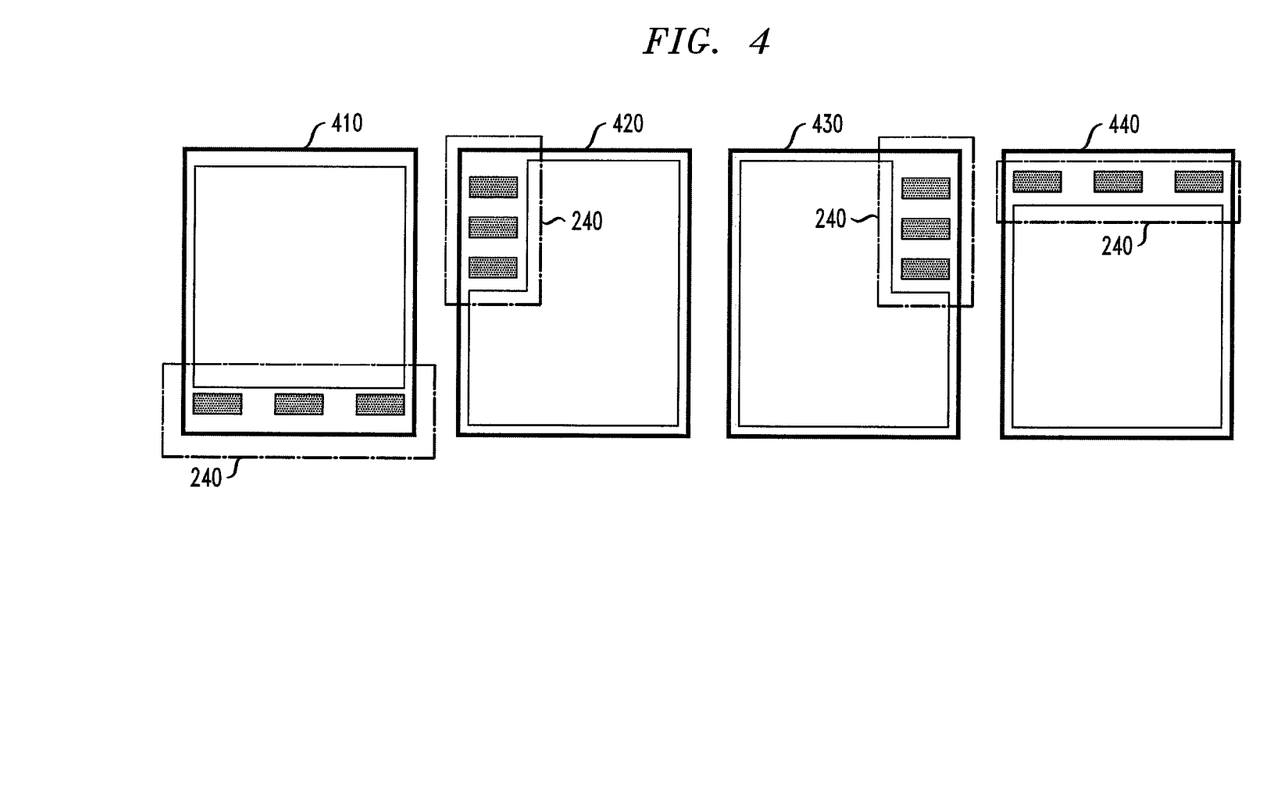
FIG. 4 illustrates a number of alternative exemplary templates, each containing one or more AdHolders.

FIG. 4 illustrates a number of alternative exemplary templates 410, 420, 430, 440, each containing one or more AdHolders 240. Generally, an author can customize the layout by moving AdHolders 240 to other parts of the blogger's content-controlled area.

Figure 5:
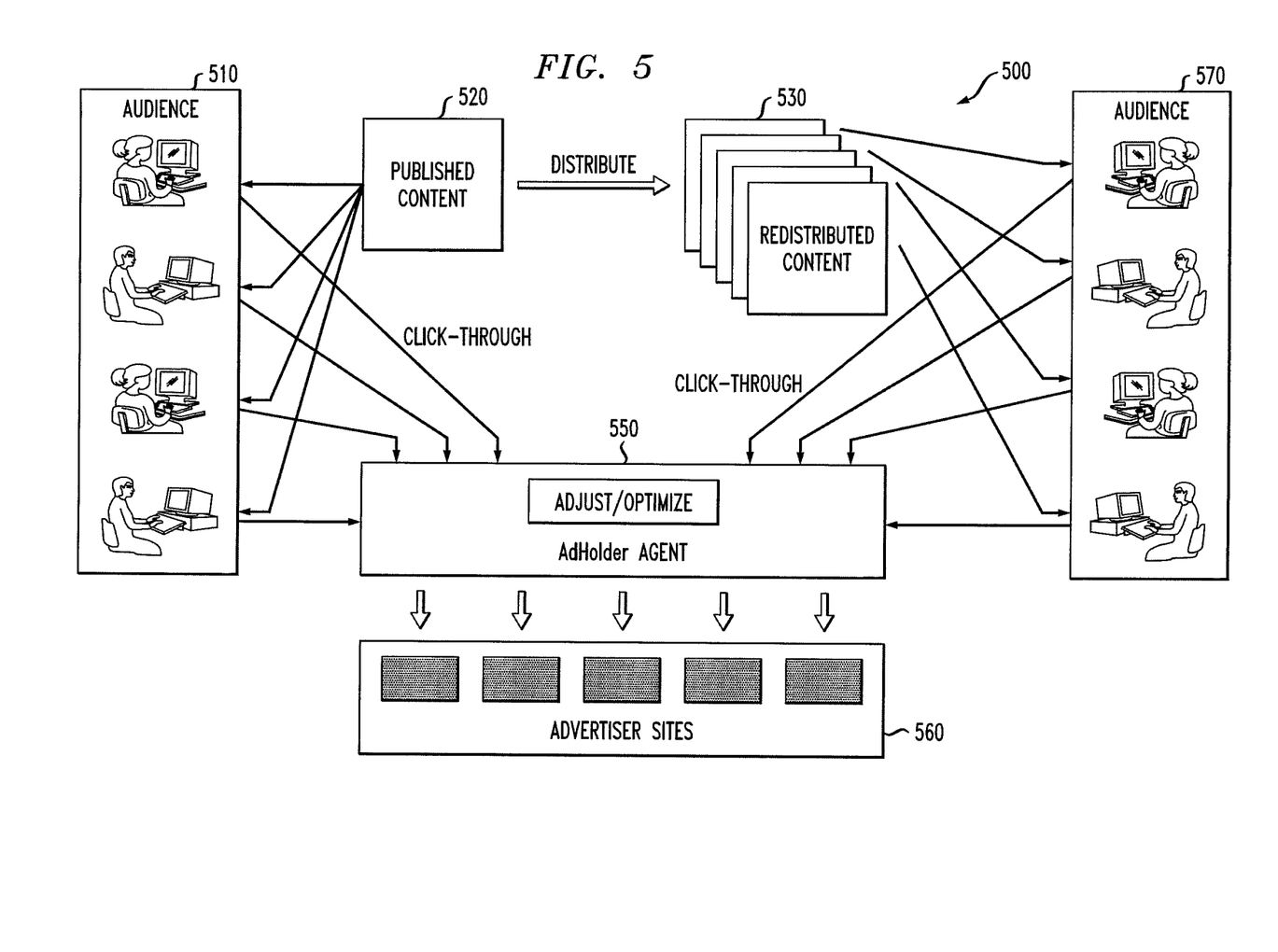
FIG. 5 illustrates an exemplary process for optimizing the placement of blog advertisements.

FIG. 5 illustrates an exemplary process 500 for optimizing the placement of advertisements. In one exemplary embodiment, the AdHolder Agent 120 selects a few test advertising feeds based on the content and the tags provided by the blogger 102 and the targeted constraints of the advertisers 170, and then injects the different feeds into different sites. For example, consider two third-party distributed sites, A and B, both having similar kinds of visitors. The AdHolder agent 120 can try different ads in the Adholders in both sites. If the ads presented on site A provide a better click-through rate than the ads presented on site B, then the AdHolder agent 120 can select the same ads used in A to replace B's ads.

As shown in FIG. 5, an audience 510 observes published content 520 and an audience 570 observes redistributed content 530. The AdHolder Agent 550 monitors the click-through rate of the audiences 510, 570 from the different sites 560 for a certain time period, and then employs the optimization process 500 to adjust/optimize the selections by replacing the advertising feeds having a lower click-through rate with feeds having a higher click-through rate (e.g., re-linking the ad holders in the content 520, 530).

In this manner, the ads presented in accordance with the AdHolders 110 change over time based, for example, on the click-through rate in order to maximize the revenue.

Figure 6:
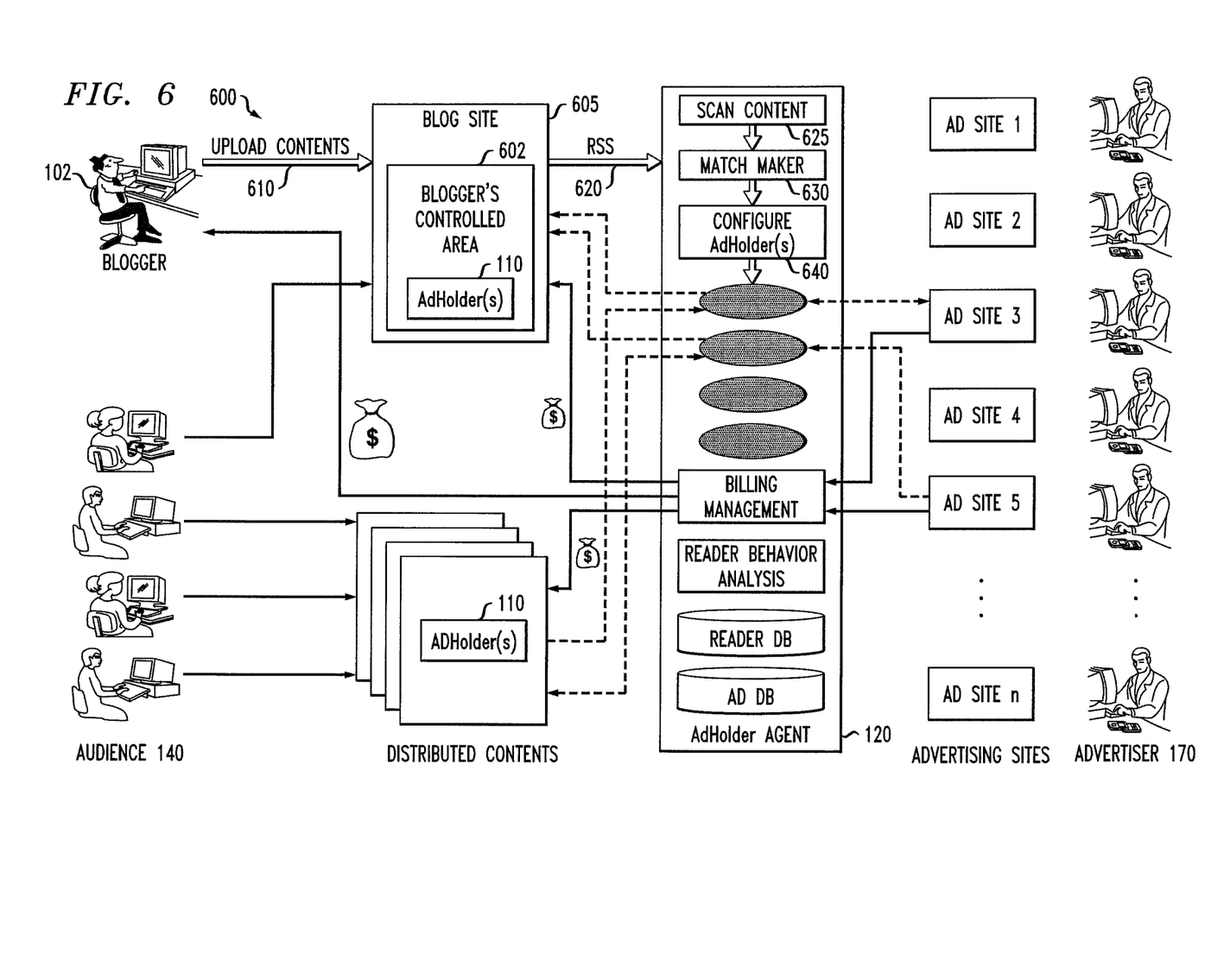
FIG. 6 illustrates a dynamic blog advertising process incorporating features of the present invention.

FIG. 6 illustrates a dynamic blog advertising process 600 incorporating features of the present invention. As shown in FIG. 6, a blogger 102 initially uploads content to a blog site 605 during step 610. For example, the blogger can publish his or her content on a blog site 605 using a template 200 (FIG. 2) that contains one or more AdHolders 110. Initially, the AdHolder(s) 110 are not enabled.

Thereafter, during step 620, the AdHolder agent 120 is notified, for example, by an RSS feed, that the new content is in the site 605. As shown in FIG. 6, the AdHolder agent 120 obtains the html or other text content of the blogger-controlled area 602, and scans the content during step 625 and executes a match-making process during step 630 to find appropriate ads. The scan can optionally be performed each time a blog is updated. In one exemplary embodiment, the matching process 630 comprises a keyword matching technique, whereby the scanned blog content is compared against targeting criteria of potential advertising campaigns. In addition, characteristics of the web site can be considered by the matching process. For example, if most visitors to a given web site are professional women, this information can be applied in the matching process. Thereafter, the AdHolder agent 120 configures and maps the AdHolders 110 embedded in blog pages during step 635, thus enabling the AdHolders 110.

As previously indicated, upon redistribution, the AdHolders 110 go with the blog page 105 and stay effective on third party websites. The dynamic blog advertising process 600 can also incorporate a billing management function, such that the advertisement revenues can be shared by the blogger 102 and blog site 105 and optionally re-distributors. In this manner, ad revenue can be shared with the blogger 102 and the provider of the blog site 605 in a mutually advantageous arrangement (in contrast to the current situation where advertising is the responsibility of the blog site provider and all revenue accrues to the site provider).

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
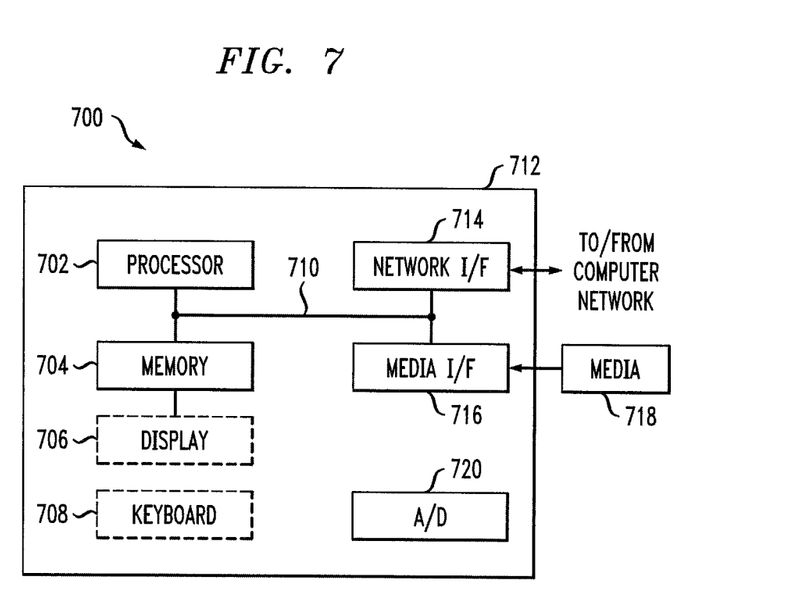
FIG. 7 depicts a computer system that may be useful in implementing one or more aspects and/or elements of the present invention.

One or more embodiments can make use of software running on a general purpose computer or workstation. FIG. 7 depicts a computer system 700 that may be useful in implementing one or more aspects and/or elements of the present invention. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Analog-to-digital converter(s) 720 may be provided to receive analog input, such as analog video feed, and to digitize same. Such converter(s) may be interconnected with system bus 710.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 702. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a provider of Internet content for distributing the Internet content, comprising:

embedding, using at least one processing device, an advertisement placeholder in the Internet content, wherein said advertisement placeholder is a placeholder for a distinct advertisement and comprises an identifier of said provider of the Internet content, and a provider of an aggregator web site and one or more policies specifying one or more content constraints specified by one or more of the provider of Internet content, at least one advertiser and the aggregator web site; and providing, using the at least one processing device, the Internet content to said aggregator web site, wherein the aggregator web site presents the Internet content to at least one end user with at least one advertisement in the advertisement placeholder, wherein the at least one advertisement in the advertisement placeholder is selected by dynamically matching the Internet content to one or more targeting criteria of the at least one advertiser such that the one or more content constraints specified in said advertisement placeholder are satisfied, and wherein a server:

obtains, using the at least one processing device, said identifier from said advertisement placeholder of said provider of the Internet content and said provider of the aggregator web site;

obtains, using the at least one processing device, a specification of terms from at least one record in at least one memory using said identifier from at least one of said provider of the Internet content, said provider of the aggregator web site and said at least one advertiser; and processes, using the at least one processing device, the advertisement placeholder to automatically share revenue from the at least one advertisement with the provider of the Internet content and a provider of the aggregator web site, wherein said revenue sharing is based on said specification of terms.

2. The method of claim 1, further comprising the step of redistributing the Internet content to a third party web site, and wherein the revenue from the at least one advertisement is automatically shared by the provider of the Internet content, the provider of the aggregator web site and a provider of third party web site.

3. The method of claim 1, wherein the at least one policy is a policy of one or more of the provider of the Internet content, the provider of the Internet aggregator web site and at least one advertiser.

4. The method of claim 3, further comprising the step of matching policies of at least two of the parties.

5. The method of claim 1, wherein the at least one policy is established for a given advertisement placeholder in the Internet content.

6. The method of claim 1, wherein the at least one policy is a default policy established by one or more of the provider of the Internet content, the provider of the Internet aggregator web site and at least one advertiser.

7. The method of claim 6, further comprising the step of selecting the at least one advertisement based on a prior performance evaluation.

8. The method of claim 1, further comprising the step of monitoring a performance of the at least one advertisement.

9. The method of claim 1, wherein the advertisement placeholder is embedded in the Internet content using one or more templates.

10. The method of claim 1, wherein said specification of terms are obtained using one or more policies of at least one of said provider of the Internet content, said provider of the aggregator web site and said at least one advertiser obtained using said identifiers in said advertisement placeholder.

11. The method of claim 1, wherein said one or more policies further specify one or more duration constraints specified by one or more of the provider of Internet content, the at least one advertiser and the aggregator web site and wherein the at least one advertisement is placed in the Internet content such that said one or more duration constraints specified in said advertisement placeholder are satisfied.

12. The method of claim 1, wherein said one or more policies further specify one or more pricing constraints specified by one or more of the provider of Internet content, the at least one advertiser and the aggregator web site and wherein the pricing constraints specified in said advertisement placeholder are enforced by an advertisement placeholder agent.

13. An article of manufacture for distributing Internet content, comprising a non-transitory machine readable storage medium containing one or more programs which when executed by one or more processing devices implement the steps of the method of claim 1.

14. A method performed by a server for distributing Internet content, comprising the steps of:

receiving, using at least one processing device, a notification that the Internet content has been posted on an aggregator web site, wherein the Internet content has one or more embedded advertisement placeholders comprising a placeholder for a distinct advertisement and an identifier of said provider of the Internet content and a provider of an aggregator web site and one or more policies specifying one or more content constraints specified by one or more of the provider of Internet content, at least one advertiser and the aggregator web site;

evaluating, using the at least one processing device, at least one policy of one or more of said provider of the Internet content, said provider of the Internet aggregator web site and at least one advertiser to identify at least one advertisement to present in the advertisement placeholder;

dynamically matching the Internet content, using the at least one processing device, to one or more targeting criteria of said at least one advertiser such that the one or more content constraints specified in said advertisement placeholder are satisfied;

obtaining, using the at least one processing device, said identifier from said advertisement placeholder of said provider of the Internet content and said provider of the aggregator web site;

obtaining, using the at least one processing device, a specification of terms from at least one record in at least one memory using said identifier from at least one of said provider of the Internet content, said provider of the aggregator web site and said at least one advertiser; and automatically sharing revenue from the at least one advertisement, using the at least one processing device, among the provider of the Internet content and the provider of the aggregator web site, wherein said revenue sharing is based on said specification of terms.

15. The method of claim 14, further comprising the step of redistributing the Internet content to a third party web site, and wherein the revenue from the at least one advertisement is automatically shared by the provider of the Internet content, the provider of the aggregator web site and a provider of third party web site.

16. The method of claim 14, wherein the at least one policy is a policy of one or more of the provider of the Internet content, the provider of the Internet aggregator web site and at least one advertiser.

17. The method of claim 16, further comprising the step of matching policies of at least two of the parties.

18. The method of claim 14, wherein the at least one policy is established for a given advertisement placeholder in the Internet content.

19. The method of claim 14, wherein the at least one policy is a default policy established by one or more of the provider of the Internet content, the provider of the Internet aggregator web site and at least one advertiser.

20. The method of claim 14, further comprising the step of monitoring a performance of the at least one advertisement.

21. The method of claim 14, wherein the advertisement placeholder is embedded in the Internet content using one or more templates.

22. The method of claim 14, wherein said specification of terms are obtained using one or more policies of at least one of said provider of the Internet content, said provider of the aggregator web site and said at least one advertiser obtained using said identifiers in said advertisement placeholder.

23. An article of manufacture for distributing Internet content, comprising a non-transitory machine readable storage medium containing one or more programs which when executed by one or more processing devices implement the steps of the method of claim 14.

24. A system employed by a provider of Internet content for distributing the Internet content, comprising:
a memory; and
at least one processing device, coupled to the memory, operative to implement the following steps:
embedding, using the at least one processing device, an advertisement placeholder in the Internet content, wherein said advertisement placeholder is a placeholder for a distinct advertisement and comprises an identifier of said provider of the Internet content and a provider of an aggregator web site and one or more policies specifying one or more content constraints specified by one or more of the provider of Internet content, at least one advertiser and the aggregator web site; and
providing, using the at least one processing device, the Internet content to said aggregator web site, wherein the aggregator web site presents the Internet content to at least one end user with at least one advertisement in the advertisement placeholder, wherein the at least one advertisement in the advertisement placeholder is selected by dynamically matching the Internet content to one or more targeting criteria of at least one advertiser such that the one or more content constraints specified in said advertisement placeholder are satisfied, and
wherein a server:
obtains, using the at least one processing device, said identifier from said advertisement placeholder of said provider of the Internet content and said provider of the aggregator web site;
obtains, using the at least one processing device, a specification of terms from at least one record in at least one memory using said identifier from at least one of said provider of the Internet content, said provider of the aggregator web site and said at least one advertiser; and
processes, using the at least one processing device, the advertisement placeholder to automatically share revenue from the at least one advertisement with the provider of the Internet content and a provider of the aggregator web site, wherein said revenue sharing is based on said specification of terms.

25. A system employed by a server for distributing Internet content, comprising:
a memory; and
at least one processing device, coupled to the memory, operative to implement the following steps:
receiving, using the at least one processing device, a notification that the Internet content has been posted on an aggregator web site, wherein the Internet content has one or more embedded advertisement placeholders comprising a placeholder for a distinct advertisement and an identifier of said provider of the Internet content and a provider of an aggregator web site and one or more policies specifying one or more content constraints specified by one or more of the provider of Internet content, at least one advertiser and the aggregator web site;
evaluating, using the at least one processing device, at least one policy of one or more of said provider of the Internet content, said provider of the Internet aggregator web site and at least one advertiser to identify at least one advertisement to present in the advertisement placeholder;
dynamically matching the Internet content, using the at least one processing device, to one or more targeting criteria of said at least one advertiser such that the one or more content constraints specified in said advertisement placeholder are satisfied;
obtaining, using the at least one processing device, said identifier from said advertisement placeholder of said provider of the Internet content and said provider of the aggregator web site;
obtaining, using the at least one processing device, a specification of terms from at least one record in at least one memory using said identifier from at least one of said provider of the Internet content, said provider of the aggregator web site and said at least one advertiser; and
automatically sharing revenue from the at least one advertisement, using the at least one processing device, among the provider of the Internet content and the provider of the aggregator web site, wherein said revenue sharing is based on said specification of terms.

* * * * *